(12) United States Patent
Dykstra et al.

(10) Patent No.: US 7,117,586 B2
(45) Date of Patent: Oct. 10, 2006

(54) PALLET DISMANTLER

(75) Inventors: Gerald L. Dykstra, Grand Rapids, MI (US); Gregory R. Bleeker, Grand Rapids, MI (US); Kent A. Deemter, Grandville, MI (US); Ryan H. Hansen, Walker, MI (US); Robert C. Humphrey, Clarkston, MI (US); Thomas J. Walkons, Sparta, MI (US)

(73) Assignee: Industrial Resources of Michigan Inc., Grand Rapids, MI (US)

( * ) Notice: Subject to any disclaimer, the term of this patent is extended or adjusted under 35 U.S.C. 154(b) by 316 days.

(21) Appl. No.: 10/604,561

(22) Filed: Jul. 30, 2003

(65) Prior Publication Data

US 2005/0022354 A1  Feb. 3, 2005

Related U.S. Application Data

(60) Provisional application No. 60/485,853, filed on Jul. 9, 2003.

(51) Int. Cl.
  *B23P 19/04* (2006.01)
  *B23D 31/00* (2006.01)
  *B23P 19/00* (2006.01)

(52) U.S. Cl. .................. 29/772; 29/252; 29/564.3; 83/943

(58) Field of Classification Search ........... 29/772, 29/564.3; 83/943
See application file for complete search history.

(56) References Cited

U.S. PATENT DOCUMENTS

| 3,869,780 | A | * | 3/1975 | Ginnow et al. | 83/477 |
| 4,241,495 | A | * | 12/1980 | Wakeem | 29/700 |
| 4,392,403 | A | * | 7/1983 | Martindale, Jr. | 83/418 |
| 4,435,892 | A | * | 3/1984 | Williams | 29/239 |
| 4,586,235 | A | * | 5/1986 | Benvenuto | 29/564.3 |
| 4,945,626 | A | | 8/1990 | Dykstra et al. | 29/564.3 |
| 5,105,526 | A | | 4/1992 | Dykstra et al. | 29/564.3 |
| 5,121,540 | A | | 6/1992 | Dykstra | 29/772 |
| 5,243,751 | A | | 9/1993 | Dykstra et al. | 29/564.3 |
| 5,414,924 | A | * | 5/1995 | Johnson et al. | 29/564.3 |

* cited by examiner

*Primary Examiner*—David P. Bryant
*Assistant Examiner*—Christopher Agrawal
(74) *Attorney, Agent, or Firm*—Van Dyke, Gardner, Linn & Burkhart, LLP (57) ABSTRACT

A method and apparatus for at least partially disassembling a pallet, the pallet having a plurality of deck board support interfaces, includes providing at least one cutting device that is positionable at any one of the board support interfaces and selectively positioning the at least one cutting device adjacent a particular board support interface of the pallet. The particular board support interface is cut with the at least one cutting device.

22 Claims, 10 Drawing Sheets

PALLET DISMANTLER

CROSS REFERENCE TO RELATED APPLICATIONS

This application claims priority from U.S. provisional patent application Ser. No. 60/485,853, filed on Jul. 9, 2003, entitled PALLET DISMANTLER, the disclosure of which is hereby incorporated herein by reference in its entirety.

BACKGROUND OF INVENTION

The present invention is directed to a method and apparatus for dismantling pallets. The invention has applicability for use with a stringer-type pallet in which two or three stringers support deck boards or a block-type pallet in which a series of blocks, typically nine, support the corners and center of a deck.

Pallets, particularly wood pallets, are subject to damage to the various boards making up the pallet. Various devices are known for dismantling a pallet in whole or in part or in order to discard the damaged boards and utilize the undamaged boards. While such known techniques are capable of completely disassembling a pallet or removing certain boards of the pallet, they are incapable of individually removing any selected board in the pallet.

SUMMARY OF INVENTION

According to an aspect of the invention, a method and apparatus for at least partially disassembling a pallet, the pallet having a plurality of deck board support interfaces, includes providing at least one cutting device that is positionable at any one of the board support interfaces and selectively positioning the at least one cutting device adjacent a particular board support interface of the pallet. The particular board support interface is cut with the at least one cutting device.

According to another aspect of the invention, a method and apparatus for at least partially disassembling a pallet includes providing at least one shearing assembly made up of a pair of arms, and a pair of shearing blades, each mounted at an end portion of one of the arms. Each of the pair of arms is pivotally mounted. The shearing assembly is adapted to selectively position the shearing blades at substantially any one of the deck board support interfaces of a pallet. At least one of the shearing assemblies includes an actuator operating on the pair of arms to selectively move the shearing blades toward each other with a force sufficient to shear fasteners at a deck board support interface of a pallet.

A method and apparatus for at least partially disassembling a pallet having a plurality of deck board support interfaces, according to another aspect of the invention, includes providing three pairs of arms, three pairs of shearing blades, each of the blades mounted at an end portion of one of the arms. Three pairs of pivot pins are provided, each pivotally mounting one of the arms. Three actuators are provided, each positioned at another end portion of one of the pair of arms. The pivot pins are between the respective shearing blades and one of the actuators. A control system is provided. The control system substantially simultaneously selectively actuates any or all of the actuators.

These and other objects, advantages and features of this invention will become apparent upon review of the following specification in conjunction with the drawings.

DESCRIPTION OF THE PREFERRED EMBODIMENT

Referring now specifically to the drawings, and the illustrative embodiments depicted therein, a pallet disassembler 20 includes one or more shearing assemblies 22 for disassembling a pallet 24 (FIGS. 1–5). Pallet 24 is made up of a plurality of deck boards 26 which are attached at deck board support interfaces 28 with either a series of stringers 30 or a series of blocks 32 (FIG. 5a). Typically, deck boards 26 are on the top and bottom of the stringers, or, alternatively, blocks, thereby defining a top and bottom surface thereof. Pallets made up of stringers typically utilize three stringers arranged in parallel at the ends and middle of the deck boards. Pallets utilizing blocks typically utilize nine blocks positioned at the corners, midway between the corners and at the center of the pallet. Fasteners, such as nails, staples, or the like, are at each deck board support interface. Such pallets are known in the art and do not form a portion of the invention.

Although three shearing assemblies, each capable of shearing a single deck board support interface 28, are illustrated herein, it should be understood that more than three shearing assemblies may be utilized or fewer than three shearing assemblies may be utilized. For example, six shearing assemblies may be provided. They may be capable of shearing simultaneously the deck board support interfaces at the top and bottom of one or more stringers or blocks. Conversely, one shearing assembly may be provided. It may be utilized to shear the fasteners at one deck board support interface at a time. Other variations may suggest themselves to the skilled artisan.

Figure 1:
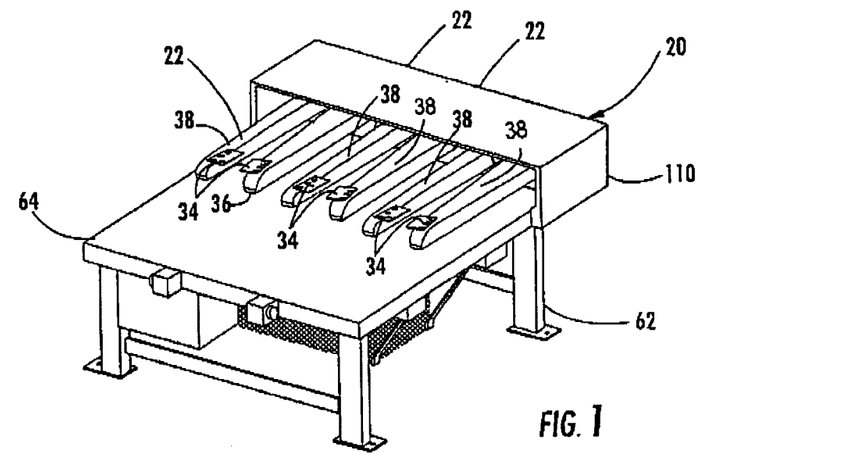
FIG. 1 is a perspective view of a pallet dismantler, according to the invention, taken from the top right front right side thereof.
Figure 2:
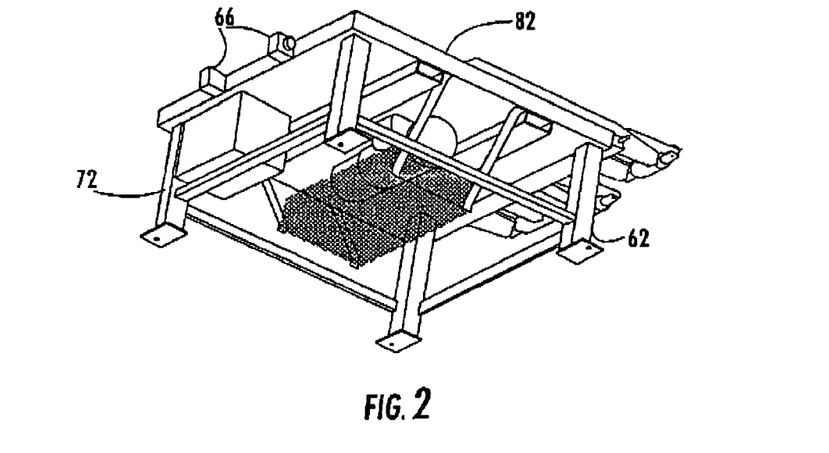
FIG. 2 is a perspective view of the pallet disassembler in FIG. 1 taken from the bottom front right view thereof.
Figure 3:
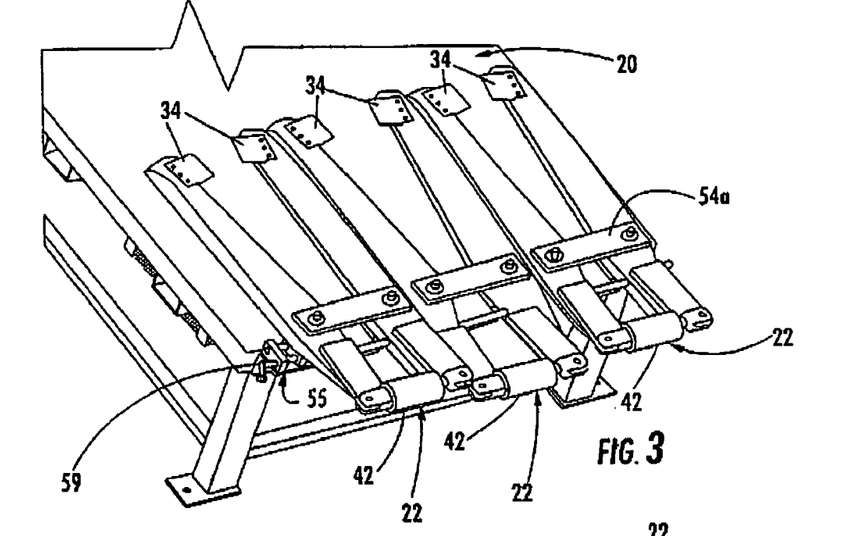
FIG. 3 is perspective view of the pallet disassembler in FIGS. 1 and 2 taken from the top rear right side view thereof.
Figure 4:
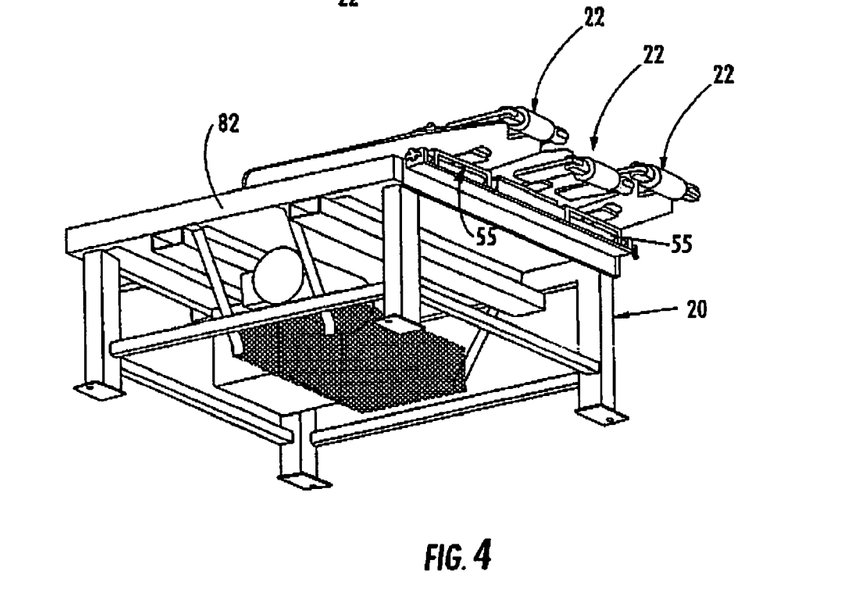
FIG. 4 is a perspective view of the disassembler in FIGS. 1–3 taken from the bottom rear right side thereof.
Figure 5:
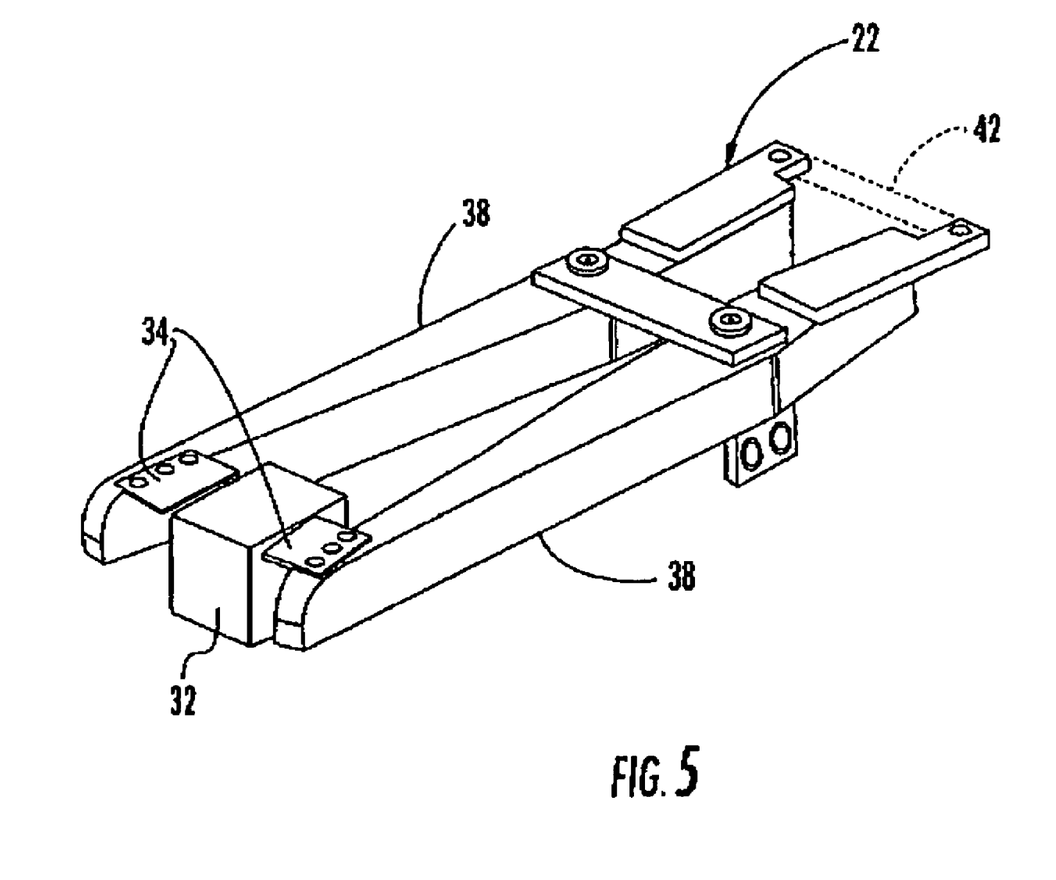
FIG. 5 is a perspective view of a shearing assembly.
Figure 5A:
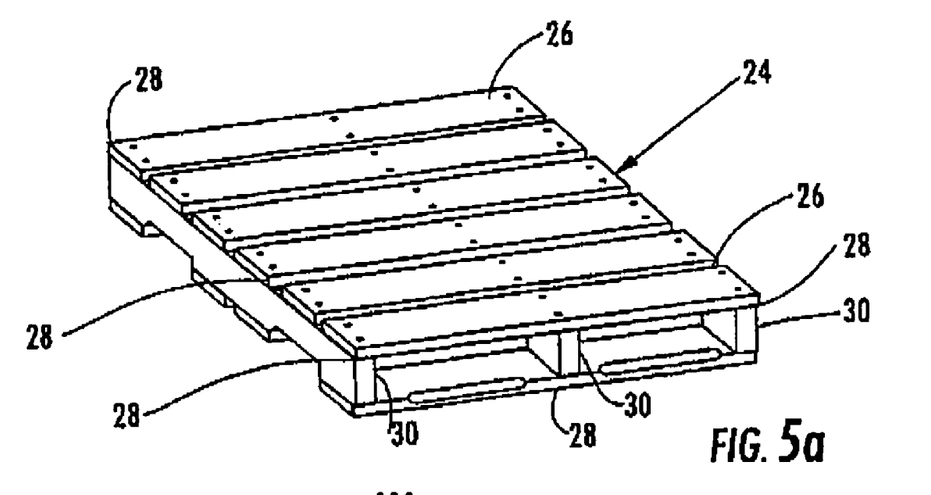
FIG. 5a is a perspective view of one type of pallet to which the invention can be applied.
Figure 6:
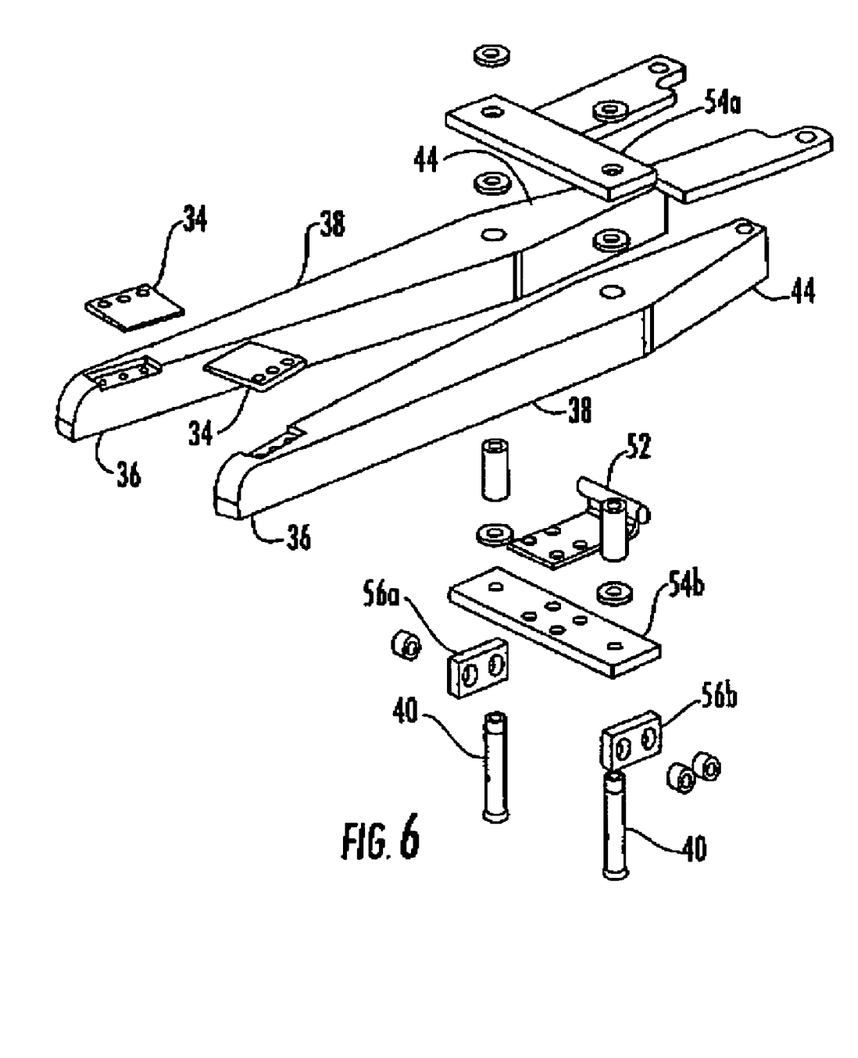
FIG. 6 is an exploded perspective view of the shearing assembly in FIG. 5.
Figure 7:
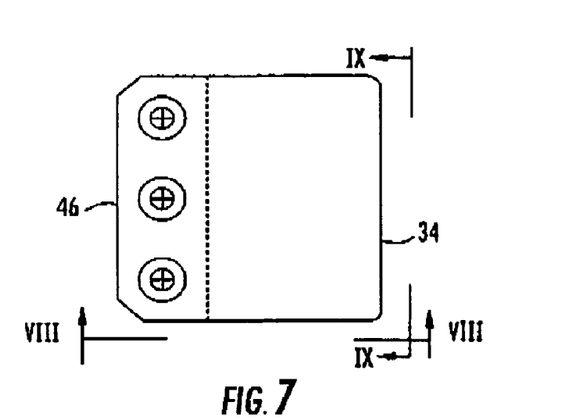
FIG. 7 is a top plan view of a shearing blade.
Figures 8, 9, 10:
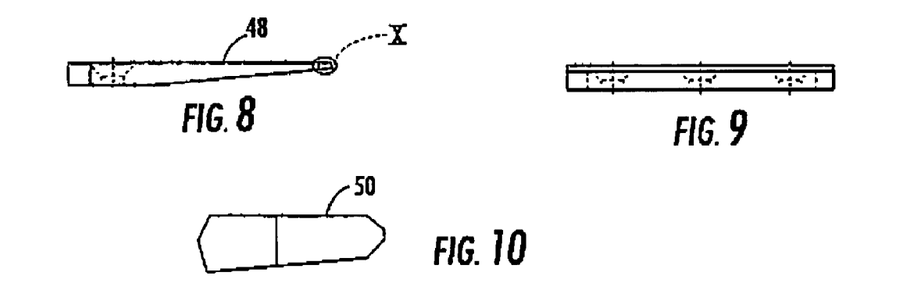
FIG. 8 is a front elevation of a shearing blade taken from the direction VIII—VIII in FIG. 7.
FIG. 9 is a side elevation of a shearing blade taken from the direction IX—IX in FIG. 7.
FIG. 10 is an enlarged front view of area X in FIG. 8.

Shearing assembly 22 includes at least one cutting device, such as a pair of shearing blades 34, each mounted at an end portion 36 of an arm 38 (FIGS. 5 and 6). A pair of pivot pins 40, each pivotally mounts one of the arms 38 to pivot about a generally vertical axis. An actuator 42, which may be electric or hydraulic, is positioned at an opposite end portion 44 of arms 38. In this manner, pivot pins 40 are between blades 34 and actuator 42. When actuator 42 is actuated, arms 38 pivot about pivot pins 40 thereby causing blades 34 to move toward or away from each other. In order to shear the fasteners at a deck board support interface 28, actuator 42 expands end portions 44 away from each other thereby forcing shearing blades 34 towards each other. A bumper 52 between the arms prevents the arms from moving past an appropriate position and thereby interfering with the space allotted for the adjacent pair of arms. Brackets 54a, 54b hold pins 40 in place while the arms remain free to rotate. The mounting brackets of the arm assemblies are mounted to side blocks 56a, 56b. Each side block mounts on a pair of rods 59 which are supported by a base 57. One rod 59 is threaded and the other is not. Turning the threaded rod will enable the arm assembly to slide left and right to adjust for various pallet sizes. In the illustrative embodiment, the center shearing assembly is fixed and the outer ones are laterally adjustable. In order to be positioned at any one of the board support interfaces, arm 38 should be of a length to reach the central most board support interface of the pallet. The pallet may be rotated and/or translated in order to selectively position the cutting device at the desired board support interface. Likewise, the pallet may be flipped on a table assembly 62 in order to access the board support interfaces on the opposite side of the pallet.

In the illustrated embodiment, shearing blades 34 are moved towards each other with a force of at least approximately 2,000 pounds and may be moved towards each other with a force of at least approximately 4,000 pounds. This ensures that fasteners at the deck board support interface of a particular type of pallet will be sheared. In the illustrative embodiment, blades 34 are identical but may be configured for the appropriate application. As illustrated, blades 34 include a mounting portion 46 and a tapered portion 48, which terminates in a tip 50. This configuration allows the tip to be inserted close to the interface between the deck board and the stringer/block.

Figure 11:
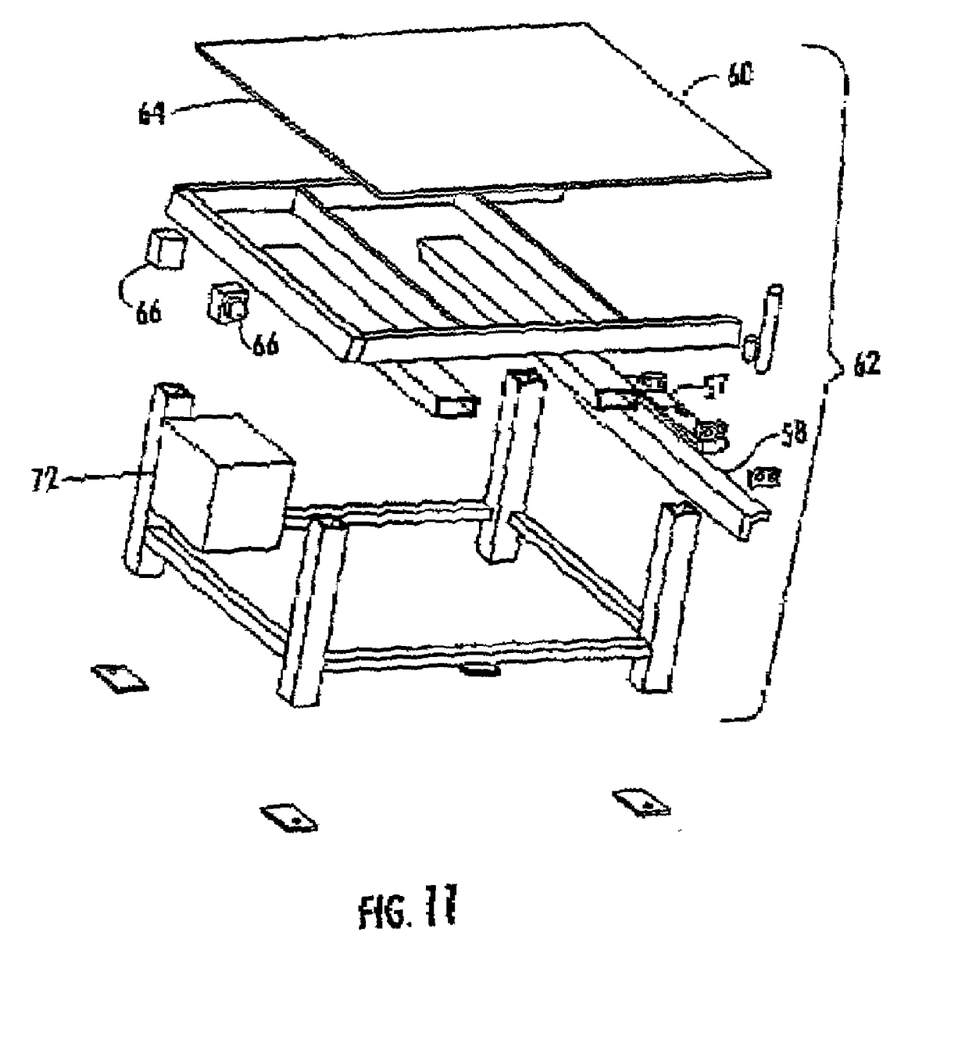
FIG. 11 is an exploded perspective view of a support table.

Shearing assemblies 22 are mounted, in the illustrative embodiment, on an angle member 58. The angle member is positioned to support shearing assemblies 22 above a tabletop 60 of table assembly 62. Tabletop 60 is for the purpose of supporting pallets. The shearing assemblies are positioned to support a pallet by arms 38, with the pallet spaced above tabletop 60. Thus, blades 34 are positioned sufficiently above the top of tabletop 60 whereby the blades are self-aligning with deck board support interfaces of a pallet. In other words, a pallet will rest on arm 38 rather than tabletop 60 thereby positioning tip 50 at interface 28. Shearing blades 34 are mounted sufficiently from a front portion 64 to distance the operator from the shearing blades. A pair of palm buttons 66 are provided, both of which must be actuated in order to actuate one or more of the shearing assemblies. This combination of distance of dual-actuations of palm buttons is for safety reasons. A safety shield 110 may be provided extending generally rearward from pivot pins 42 cover pinch points toward the rear of the shearing assembly.

Figure 12:
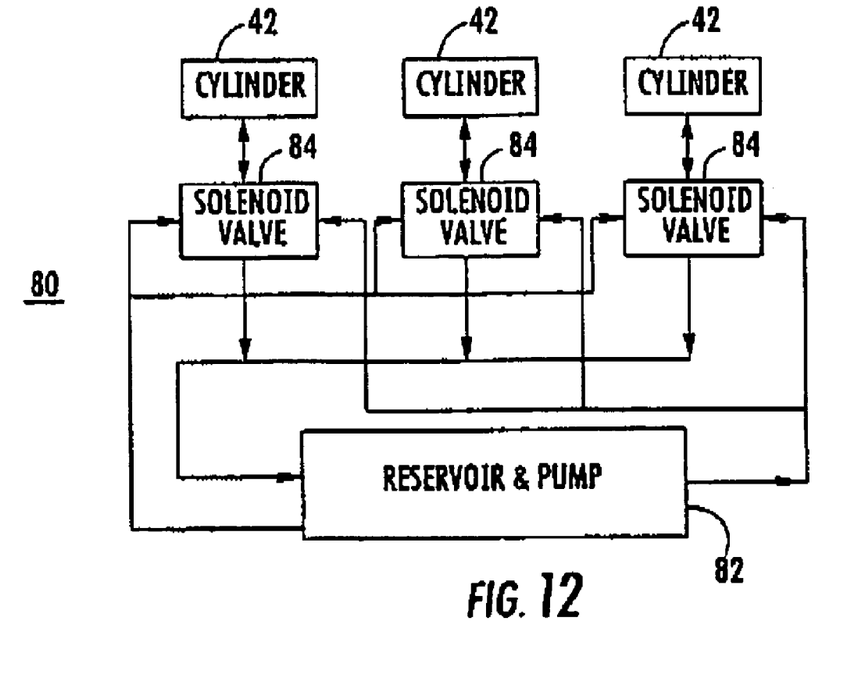
FIG. 12 is a schematic diagram of a hydraulic system useful with the invention.
Figure 13:
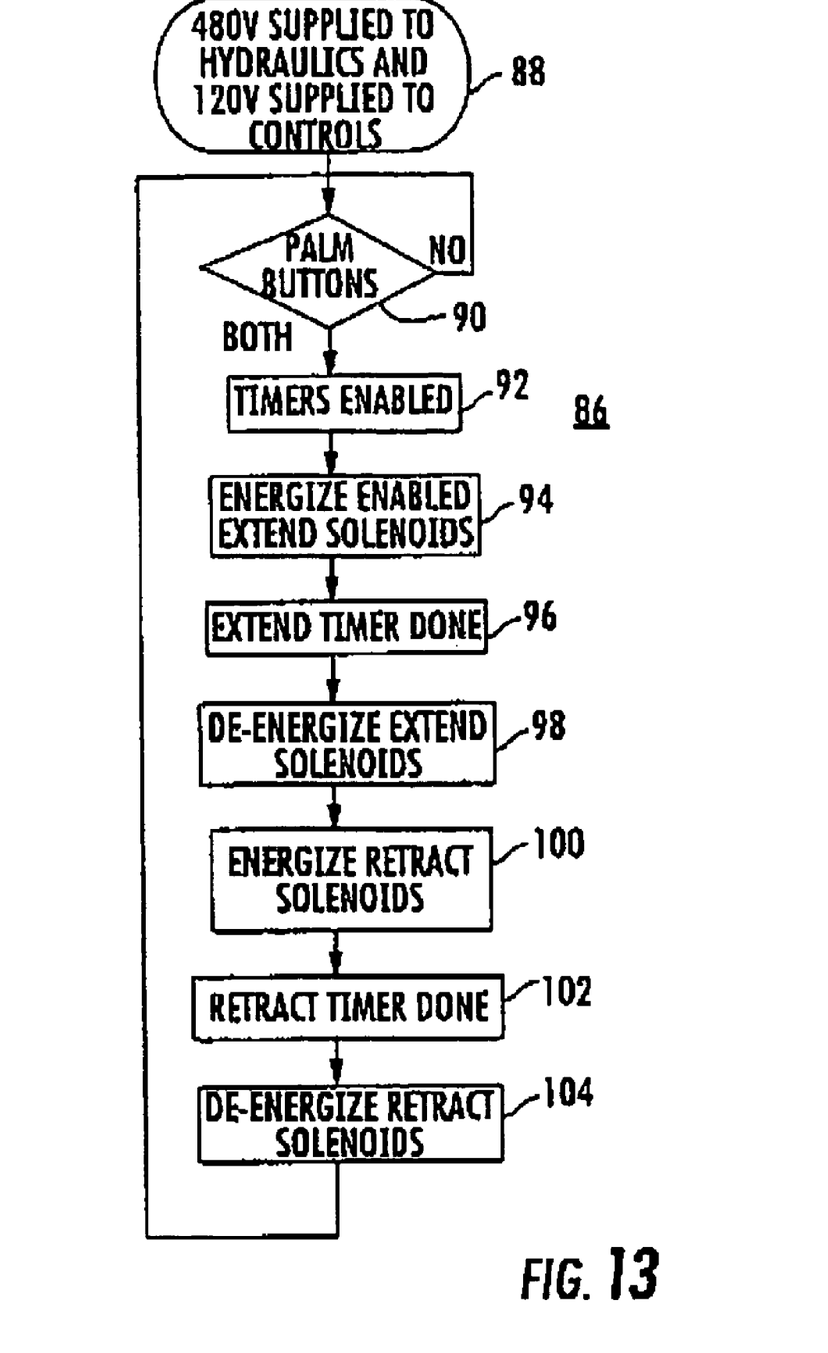
FIG. 13 is a flowchart of a control algorithm useful with the invention.
Figure 14:
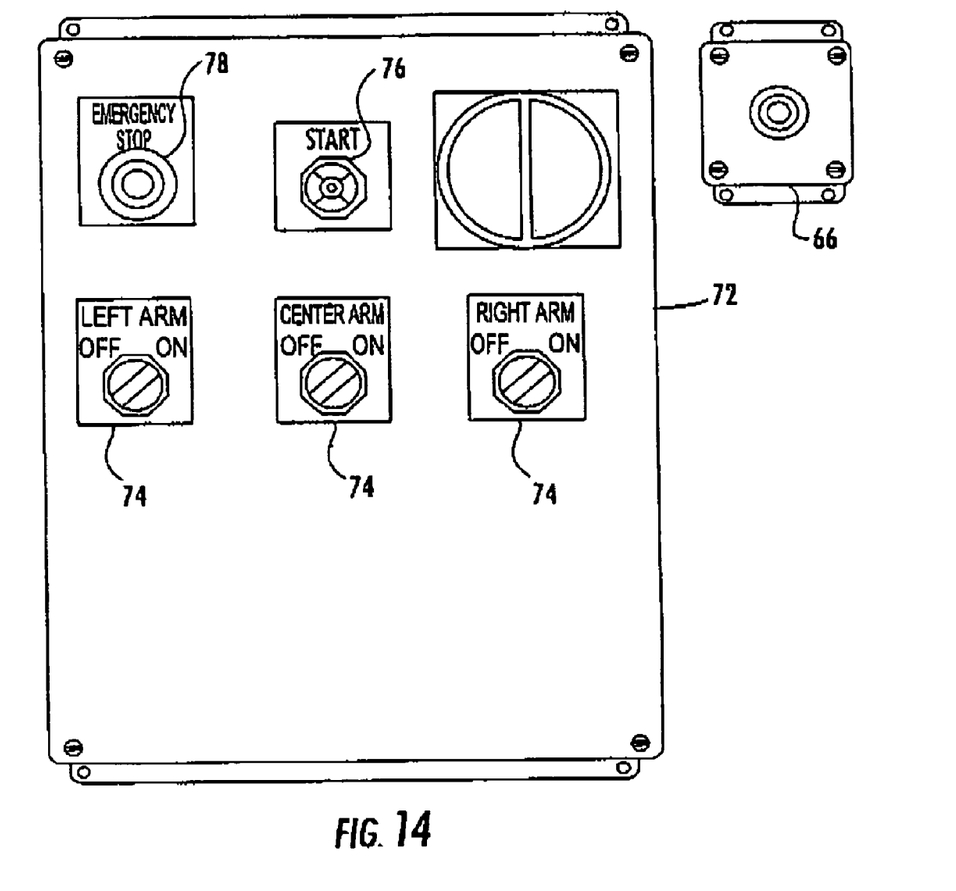
FIG. 14 is a front elevation of a control panel useful with the invention.

A control system 70 is provided (FIGS. 12–14). In an embodiment having more than one shearing assembly 22, control system 70 allows any one, or a combination of more than one, or all, of the actuators 42 to be substantially simultaneously actuated. This is accomplished by a control panel 72 having individual ON/OFF switches 74 for enabling each of the shearing assemblies. In addition, start button 76 and emergency stop button 78 are provided to start and stop control system 70. Control system 70 includes a hydraulic circuit 80 having a reservoir and pump 82 and a plurality of solenoid valves 84, each of which is electrically actuated in order to selectively actuate an actuator 42. Actuation of any solenoid valve 84 takes a combination of the associated ON/OFF switch 74 being placed in the ON position and the two palm buttons 66 being actuated. Each solenoid valve 84 has multiple positions for positively extending and positively retracting the associated cylinder 42.

A control algorithm 86 begins by appropriate power being applied to the controls at 88 and a determination being made whether both palm buttons are being depressed at 90. If so, suitable timers are enabled at 92 and the enabled extend solenoids are energized at 94. When the timer has expired at 96, the extend solenoids are de-energized at 98. Retract solenoids are then actuated at 100 and a timer is set. When the timer expires at 102, the retract solenoids are de-energized at 104.

Figure 15:
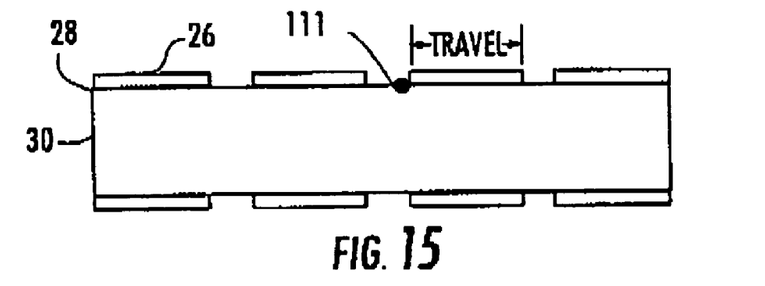
FIG. 15 is a side elevation of an alternative embodiment.
Figure 16:
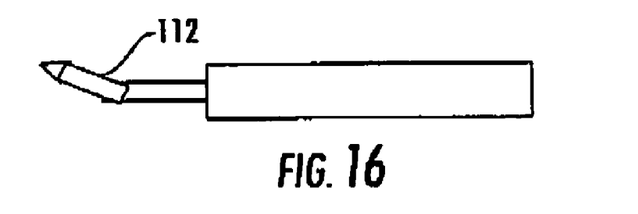
FIG. 16 is a side elevation of another alternative embodiment.

As should be apparent to the skilled artisan, other changes can be made and still keep within the spirit of the invention. By way of example, shearing assemblies 22 may be made vertically adjustable, thereby accommodating various pallet configurations. Moreover, shearing blades 34 may take on various configurations. Moreover, while the cutting devices are illustrated as shearing blades, other cutting devices may be used. By way of example, a diamond wire 111 may be positioned at the board support interface 28 and relative movement provided between the board support interface and the diamond wire to cut the fasteners. This may be accomplished by either moving the diamond wire, moving the pallet, or both. The cutting device may also be in the form of an air chisel 112, which may be positioned at any one of the board support interfaces 28 to cut the fasteners. Other cutting devices may be used.

Changes and modifications in the specifically described embodiments can be carried out without departing from the principles of the invention which is intended to be limited only by the scope of the appended claims, as interpreted according to the principles of patent law including the Doctrine of Equivalents.

The invention claimed is:

1. A method of at least partially disassembling a pallet, the pallet having a plurality of deck board support interfaces, said deck board support interfaces arranged in rows and columns with at least three deck board support interfaces in each row and each column, said method comprising:

providing at least one cutting device that is positionable at any one of the deck board support interfaces, said at least one cutting device comprising a pair of arms having first and second opposite end portions and a pair of shearing blades each blade mounted at said first end portion of one of said arms, wherein each of said pair of arms is rotably mounted;

selectively positioning said at least one cutting device adjacent a particular deck board support interface of the pallet; and cutting fasteners at the particular deck board support interface with said at least one cutting device without the necessity of cutting fasteners at other deck board support interfaces in the row and the column in which the particular deck board support interface is located, said cutting including selectively moving said shearing blades toward each other including rotating said pair of arms, said rotating including applying a force moving said second end portions of said pair of arms apart.

2. A pallet dismantler for disassembling a pallet having a plurality of deck board support interfaces, said dismantler comprising:

at least one shearing assembly comprising a pair of arms having first and second opposite end portions, and a pair of shearing blades, each blade mounted at said first end portion of one of said arms, wherein each of said pair of arms is pivotally mounted at a pivot assembly, said pivot assembly positioned between said first and second end portions, said shearing assembly is adapted to selectively position said shearing blades at substantially any one of the deck board support interfaces of a pallet including straddling any other deck board support interface between the one of the deck board support interfaces and said pivot; and said at least one shearing assembly including an actuator, said actuator selectively applying a force moving said second end portions of said pair of arms apart to rotate said pair of arms about said pivot assembly to selectively move said shearing blades toward each other with a force sufficient to shear fasteners at a deck board support interface of a pallet.

3. The dismantler of claim 2, wherein said at least one shearing assembly comprises at least three shearing assemblies.

4. The dismantler of claim 3, wherein at least two of said at least three shearing assemblies are adjustably positioned with respect to others of said at least three shearing assemblies.

5. The dismantler of claim 2, including a pallet support surface below said at least one shearing assembly.

6. The dismantler of claim 5 wherein said at least one shearing assembly is spaced above said support surface sufficiently to support a pallet from said at least one shearing assembly whereby said pair of shearing blades is self-aligning with a deck board support interface of a pallet.

7. The dismantler of claim 5, wherein said pallet support surface spaces an operator sufficiently from said at least one shearing assembly to limit operator contact with said shearing blades.

8. The dismantler of claim 2, wherein said actuator comprises a hydraulic actuator.

9. The dismantler of claim 2, wherein said actuator comprises an electrical actuator.

10. The dismantler of claim 2, wherein said actuator selectively moves said shearing blades toward each other with a force of at least approximately 2,000 pounds.

11. The dismantler of claim 2, wherein said actuator selectively moves said shearing blades toward each other with a force of at least approximately 4,000 pounds.

12. The dismantler of claim 2 including a safety cover covering at least a portion of said at least one shearing assemblies.

13. A pallet dismantler for disassembling a pallet having a plurality of deck board support interfaces, said dismantler comprising:

three pairs of arms, three pairs of shearing blades, each of said blades mounted at an end portion of one of said arms, three pivot assemblies, each of said pivot assemblies pivotally mounting one of said pair of arms, three actuators each positioned at another end portion of one of said pair of arms wherein said pivot assemblies are between the respective said shearing blades and one of said actuators, wherein each of said actuators forces said another end portion of the corresponding one of said pair of arms apart to rotate the corresponding pair of arms and force the corresponding shearing blades toward each other, said pairs of arms having central portions between said shearing blades and said pivot assemblies, said central portions adapted to straddle a deck board support interface when the corresponding pair of shearing blades is positioned at another deck board support interface; and a control system, said control system having operator switches for individually enabling said actuators to substantially simultaneously selectively actuated any or all of said actuators.

14. The dismantler of claim 13 including a pallet support surface below said arms.

15. The dismantler of claim 14, wherein said shearing blades are sufficiently spaced above said support surface to support a pallet from said shearing blades whereby said shearing blades are self-aligning with deck board support interfaces of a pallet.

16. The dismantler of claim 13, wherein said blades are positioned at least approximately 30 inches from the respective one of said pivot assemblies.

17. The dismantler of claim 13, wherein at least two of said pivot assemblies are adjustably positioned with respect to others of said assemblies.

18. The dismantler of claim 13 including bumpers between each pair of arms to limit motion of said arms.

19. The dismantler of claim 13, wherein said pallet support surface positions an operator at least approximately 30 inches from said shearing blades.

20. The dismantler of claim 13 including a safety cover covering portions of said three pair of arms including said pivot pins and said actuators.

21. The dismantler of claim 13, wherein said control system comprises at least in part a hydraulic control system.

22. The dismantler of claim 13, wherein said control system comprises at least in part an electrical control system.

* * * * *